United States Patent [19]

Blount

[11] 4,238,375

[45] Dec. 9, 1980

[54] PROCESS FOR THE PRODUCTION OF ORGANIC HALOSILICON ACID RESINOUS PRODUCTS AND THEIR REACTION PRODUCTS UTILIZING PHENOL COMPOUNDS

[76] Inventor: David H. Blount, 5450 Lea St., San Diego, Calif. 92105

[21] Appl. No.: 32,411

[22] Filed: Apr. 23, 1979

Related U.S. Application Data

[63] Continuation-in-part of Ser. No. 908,106, May 22, 1978, Pat. No. 4,198,491, which is a continuation-in-part of Ser. No. 845,464, Oct. 25, 1977, Pat. No. 4,120,937.

[51] Int. Cl.$^3$ .............................................. C08L 91/00
[52] U.S. Cl. ...................................... 260/18 S; 260/9; 521/82; 521/86; 521/99; 521/122; 525/446; 525/474; 525/479; 528/10; 528/39; 528/29; 528/212; 528/219
[58] Field of Search ..................... 528/10, 39, 29, 212, 528/219; 525/446, 474, 479; 260/9, 18 S; 521/82, 86, 99, 122

[56] References Cited

U.S. PATENT DOCUMENTS 4,120,937  10/1978  Blount .................................. 528/26

Primary Examiner—Melvyn I. Marquis

[57] ABSTRACT

Dry granular silicon acid, an organic phenol and a silicon halide are mixed simultaneously to produce an organic halosilicon acid resinous product.

35 Claims, No Drawings

PROCESS FOR THE PRODUCTION OF ORGANIC HALOSILICON ACID RESINOUS PRODUCTS AND THEIR REACTION PRODUCTS UTILIZING PHENOL COMPOUNDS

CROSS-REFERENCE TO RELATED APPLICATIONS

This application is a continuation-in-part of my copending U.S. patent application, Ser. No. 908,106, filed May 22, 1978, now U.S. Pat. No. 4,198,491 which is a continuation-in-part of patent application, Ser. No. 845,464, filed Oct. 25, 1977, now U.S. Pat. No. 4,120,937.

BACKGROUND OF THE INVENTION

This invention relates to a process for the production of novel organic halosilicon acid resinous products by chemically reacting a silicon acid, an organic phenol and a silicon halide simultaneously.

The silicon acid used in this process may be produced by the chemical reaction of a dry alkali metal metasilicate with a mineral acid or an acid hydrogen containing salt. The silicon acid produced by this method was analyzed by infrared analysis, using the IR KBr disc method. The infrared analysis was very similar to the standard infrared analysis that was obtained with Mallinckrodt's hydrated silica, except for the area which shows the presence of Si-H bonds and has a molecular weight of 78±25 gm/mol. The hydrated silica with Si-H bonds is a silicoformic acid. A dry, fine granular hydrated silica ($SiO_2 \cdot xH_2O$) produced by any of the commonly known methods may be used in this instant invention. Natural occuring silicon acids with free silicic acid groups may also be used in this invention.

Alkali silicon compounds such as sodium silicate, potassium silicate, calcium silicate, magnesium silicate and other alkali metal silicates and alkaline earth metal silicates may be used in this invention. Ammonia silicate may be used in this invention.

The silicon halide to be employed may be one of those which have the structural formula:

$$R_y SiX_z$$

wherein X is any halogen or mixture thereof, with the preferred being chlorine; wherein R is independently selected from the group consisting of a monovalent hydrogen radical, a monovalent alkoxy radical, and a monovalent aryloxy radical, an aryl radical, an alkenyl radical, a cycloalkyl radical, an aralkyl radical, an alkaryl radical, a cycloalkenyl radical; wherein y is an integer from 0-2, inclusive; wherein z is an integer from 1-4, inclusive, and the sum of y plus z is equal to four. Each of the R radicals should preferably, although not essentially, contain less than seven carbon atoms since the compounds containing these radicals are more readily available and have been found to be the most useful. The R radicals may be the same or different. Illustrative hydrocarbon, alkoxy, and aryloxy are as follows: alkyl radicals, such as methyl, ethyl, propyl, isopropyl, butyl, hexyl, octyl, decyl, dodecyl, etc.; alkenyl radicals, such as ethenyl, propenyl, etc.; alkynyl radicals such as ethynyl, propynyl, etc.; cycloalkyl radicals, such as cyclopropyl, cyclobutyl, cycloamyl, cyclohexyl, etc.; cycloalkyenyl radicals, such as cyclobutenyl, cyclopentenyl, cyclohexenyl, etc; aryl radicals, such as phenyl, anthracyl, naphthyl, etc.; aralkyl radicals, such as benzyl, phenyl-ethyl, phenyl-propyl, etc.; alkaryl radicals, such as xylyl, tolyl, ethylphenyl, p-butylphenyl, p-diisobutyl phenyl, etc.; alkoxy radicals, such as methoxy, ethoxy, propoxy, etc.; and aryloxy radicals such as phenoxy, p-butyl-phenoxy, etc. In addition, the hydrocarbon, alkoxy or aryl-oxy group may be substituted with non-interfering substituents such as halo (i.e., chloro, bromo, fluor or iodo) nitro, sulfo, etc. The substituent in the silicon halide is any halogen or mixture thereof, with the preferred being chlorine.

Exemplificative silicon halides include, but are not limited to, the following compounds: silicon tetrachloride; silicon tetrabromide; silicon tetrafluoride; silicon tetraiodide; methyltrichlorosilane; dimethyldichlorosilane; trimethylchlorosilane; diethyldichlorosilane; di-n-butyl-dichlorosilane; diphenyldichlorosilane; phenyltrichlorosilane; ethyl phenyldichlorosilane; methyl ethyldichlorosilane; chloropolysilanes; allyl trichlorosilane; vinyl trichlorosilane; chlorosilcarbanes; chlorosiloxanes; etc.

Silicon tetrachloride is the preferred silicon halide. The silicon tetrachloride may be utilized with any of the listed silicon halides or mixtures of the listed silicon halides.

For the purpose of this invention, the products produced by the chemical reaction of the organic phenol, silicon acid and silicon halide will be known as organic halosilicon acid resinous product, and on further reaction of the organic halosilicon acid compound with an organic compound, it will be known as an organic silicon acid resinous product.

The organic halosilicon acid resinous product may be used as an intermediate in the production of many organic silicon acid compounds. The organic halosilicon acid resinous product will react chemically with suitable organic compounds to produce organic silicon acid resinous products or foams. The resinous organic silicon acid products may be utilized as protective coating on wood and metal, as caulking compounds, as molding powders, as films and other uses. The organic silicon acid foams may be used for floatation, for insulation, for sound-proofing material, and as a structured strenghtening material and other uses. The organic halosilicon acids may be used as catalysts (and react with) to polymerize such compounds as methyl styrene, vinyl alkyl ethers, isobutylene, butylene, ethylene, propylene, butadiene, allyl halides, alkene compounds, olefin compounds, terpenes, coumarone-indene compounds, furfuryl alcohol, furfural, ethylene oxide, propylene oxide, styrene oxide and other compounds. The organic halosilicon acids will also enter into and become a part of the polymer.

SUMMARY OF THE INVENTION

I have discovered that a dry, fine granular silicon acid will react chemically with a silicon halide to produce a mixture of halosilicon acids as illustrated in U.S. patent application Ser. No. 845,464, filed Oct. 25, 1977, by David H. Blount. I have also discovered that a silicon acid, a phenol compound and a silicon halide may be mixed simultaneously in the ratio of about equal mols to produce an organic halosilicon acid resinous product.

The basic process may be varied in produce organic halosilicon acid. The reactants may be added simultaneously or the silicon halide may be reacted first with the silicon acid, then reacted with the phenol compound, or the silicon halide may be reacted first with the phenol compound, then reacted with the silicon acid.

The preferred method is to simultaneously mix 0.25 to 2 mols of phenol compound, 0.25 to 2 mols of silicon acid and 1 mol of silicon halide while agitating and keeping the temperature below the boiling temperature of the reactants, thereby producing a phenol halosilicon acid resinous product.

The reactions of this invention may take place under any suitable physical condition. While many of the reactions will take place acceptably at ambient temperature and pressure, in some cases, better results may be obtained at somewhat elevated temperatures and pressures. Preferably, the reaction takes place at a temperature between 0° C. and the boiling temperature of the silicon halide. In some cases, it may be necessary to cool the reactant vessel to liquefy the gaseous organic compound.

The organic halosilicon acid resinous products produced by the present process will react chemically with suitable organic compounds and polymers to produce organic silicon acid resinous products. Suitable organic compounds and/or polymers include monohydroxy compounds, polyols, aldehydes, organic acids, organic anhydrides, ketones, ketenes, isocyanates, polyisocyanates, vinyl monomers, organic dienes, mono-amine compounds, polyamines, polyamides, ammonia, imide compounds, phenol compounds, polyester polymers with free hydroxyl and/or carboxyl groups, polyether glycols or oxides, polyepichlorohydrin, epoxy compounds and resins, halohydrin, epihalohydrin isocyanic acid, allyl halides and alcohols, ethylene, propylene, alkene compounds, olefin compounds, coumaroneidene, terpenes, polyvinyl alcohol, polyallyl alcohol, thiodiglycol, polythioethers, aminoplast, phenoplast, nitrile compounds, halogen alkyl or aryl silanes, polyvinyl acetal resins, nitroparaffins, natural products containing hydroxyl and/or carboxyl groups, sulphonic acids and mixtures thereof.

The organic halosilicon acid resinous products will react chemically with organo-metallic compounds containing a metal more active than silicon such as dimethyl zinc, diethyl zinc, sodium organic compounds, lithium organic compounds, alkyl magnesium halides and aryl magnesium halides to produce organic silicon acid resinous products. The Grignard Reagents are the preferred organometallic compounds.

Suitable phenol compounds such as phenol, cresols, xylenols, creosote, resorcinol, 2,2-bis (4-hydroxy phenyl) propane, thiophenol, thiocresols, Bisphenol A and mixture thereof may be used in this invention. Phenol is the preferred phenol compound.

Any suitable organic compound will react with the organic halosilicon and resinous product such as organic compounds containing the following functional groups:

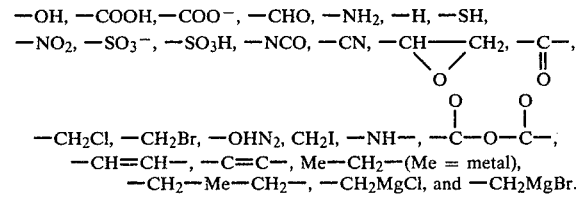

Any suitably monohydroxyl compound may be used in this invention such as methanol, ethanol, propanol, ispropyl alcohol, allyl alcohol, furfuryl alcohol, butanol, isobutanol, 5-butyl alcohol, isomeric pentanols, isomeric hexanols, isomeric heptanols, cyclohexanol, methylcyclohexanol, benzyl alcohol, cyclohexanomethanol, methallyl alcohol and mixtures thereof.

Any suitable aldehyde may be used in this invention such as formaldehyde, acetaldehyde, propionaldehyde, butyl aldehyde, furfural, pentanals, hexanals, heptanals, octanals, and the corresponding semi-acetals and full acetals, crotonaldehyde, acrolein, acrylic aldehyde, chloral, parafolmaldehyde and mixtures thereof.

Any suitable monocarboxylic acid may be used in the invention such as acetic acid, formic acid, propanoic acid, glycolic and butanoic acid, pentanoic acid, hexanoic acid, heptanoic acid, octanoic acid, nanonoic acid, decanoic acid, undecyclic acid, lauric acid, myristic acid, palmetic acid, stearic acid, malic acid and mixtures thereof.

Any suitable polycarboxylic acid may be used in this invention such as phthalic acid, maleic acid, succinic acid, oxalic acid, malonic acid, glutaric acid, adipic acid, pimelic acid, suberic acid, isophthalic acid, fumaric acid, azelaic acid, sebacic acid, terephthalic acid, itaconic acid, tartaric acid, fatty acids and mixtures thereof.

Any suitable dicarboxylic acid anhydride may be used in this invention such as phthalic anhydride, maleic anhydride, succinic anhydride, glutaric anhydride, poly(adipic anhydride), tetrachlorophthalic anhydride, dl-camphoric anhydride, 1,2-cyclohexane-dicarbolic anhydride, diglycolic anhydride, tetrahydrophthalic anhydride, dedecenylsuccinic anhydride, hexadecylsuccinic anhydride, nitrophthalic anhydride, ende-cis-5-norborn-ene-2,3-dicarbolic anhydride, cis-4-cyclohexene-1,2-dicarboxylic anhydride, pyromellitic dianhydride and mixtures thereof.

The term "polyols", as used in the Specification and Claims, is comprised of any organic compound or polymer containing 2 or more free OH groups. Suitable polyols such as polyhydric alcohols include e.g. ethylene glycol, propylene-1,2-and-1,3-glycol, butylene-1,4-and-2,3-glycol, hexane-1,6-diol, octane-1,8-diol, neopentyl glycol, cyclohexane dimethanol (1,4-bis-hydroxymethyl cyclohexane), 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols, resorcinol and mixtures thereof.

Suitable polyols such as polyester with 2 or more free OH groups may be used in this invention, including e.g. reaction products of polyhydric alcohols, preferably dihydric alcohols with optional addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocylic and may be substituted, e.g. with halogen atoms and/or may be unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl terephthalate and bis-glycol terephthalate.

Suitable polyols such as polyethers with 2 or more hydroxyl groups may be used in this invention and may be prepared e.g. by polymerizing epoxides such as ethylene oxide, propylene oxide, butylene oxide, tetrahydrofuran, styrene oxide or epichlorohydrin, each with itself, e.g. in the presence of $BF_3$, or by addition of these epoxides, optionally as mixtures or successively, to starting components which contain reactive hydrogen atoms such as alcohols or amines, e.g. water, ethylene glycol, propylene glycol-(1,3) or -(1,2), trimethylolpropane, 4,4'-dihydroxydiphenylpropane, aniline, ammonia, ethanolamine, or ethylene diamine. Sucrose polyethers such as those described e.g. in German Auslegeschrfit Nos. 1,176,358 and 1,064,938 may also be used according to the invention. Polyethers modified with vinyl polymers of the kind which can be obtained e.g. by polymerizing styrene or acrylonitrile in the presence of polyesters (U.S. Pat. Nos. 3,383,351; 3,304,273; 3,523,093 and 3,110,695 and German Pat. No. 1,152,536) and polybutadienes and polybutadiene copolymers which contain 2 or more OH groups are also suitable.

Suitable polyols such as polyacetals which contain 2 or more hydroxyl groups which can be prepared from glycols such as diethylene glycol, triethylene glycol, 4,4'-dioxethoxy-diphenyl dimethylmethane, hexanediol and formaldehyde may also be used. Polyacetals suitable for the invention may also be prepared by polymerizing cyclic acetals.

Suitable polyols such as polycarbonates with 2 or more hydroxyl groups are of the kind known per se which can be obtained e.g. by reacting diols such as propane-1,3-diol, butane-1,4-diol and/or hexane-1,6-diol or diethylene glycol, triethylene glycol or tetraethylene glycol with diaryl carbonates such as diphenyl carbonate or phosgene.

Other suitable polyols include modified or unmodified natural polyols such as castor oil, carbohydrates or starch, polyhydroxyl compounds containing urethane or urea groups, addition products of alkylene oxide to phenolformaldehyde resins or to urea-formaldehyde resins, the polyester amides and polyamides also include the predominantly linear condensates obtained from polyvalent saturated and unsaturated carboxylic acids or their anhydrides and polyvalent saturated and unsaturated amino alcohols.

Suitable polyols include polyvinyl alcohol and polyallyl alcohol polymers.

Any suitable epoxide compound may be used in this invention such as ethylene oxide, propylene oxide, styrene oxide, butylene oxide, trichlorobutylene oxide, tetrahydrofuran, epichlorohydrin, glycidol, methyl epichlorohydrin, 1,2-epoxy-butane, 1,2-epoxycyclohexane, epoxyethane, 1,2-epoxypropane, 1-chloro-2,3-epoxypropane, 1:2, 2:4-diepoxybutane, epoxyethylbenzene, 2:3, 6:7-diepoxy-2,6-dimethyl-4-octene, epoxidized polyhydroxy compounds, epoxidized vegetable oils, epoxidized unsaturated fatty acides, epoxidized diolefin or polyolefin compounds; unsaturated epoxide compounds such as glycidyl methacrylate and glycidyl acrylate and mixtures thereof.

Any suitable vinyl monomer may be used in this invention such as acrylic acid, methacrylic acid, ethyl acrylic acid, methyl methacrylic acid, methyl styrene, styrene, n-vinyl-2-pyrrolidone, vinyl acetate, methyl alkanes, vinyl alkyl ethers, allyl vinyl ethers, alicylic ethers, aryl alkyl vinyl ethers, aryl vinyl ethers, vinylidene chloride, vinyl chloride, vinyl toluenes, divinyl benzenes, acrylonitrile, methacrylonitrile, alkyl esters of acrylic and methacrylic acids in which the alkyl group contains 1-6 carbon atoms. The silicon halide acts as a catalist and also reacts with the vinyl monomer, so various amounts may be used, 0.25 to 20 mols.

Any suitable organic diene may be used in this invention such as 1,3-butadiene, 2,3-dimethylbutadiene, piperylene, isobutylene, butylenemethyl linoleate, 1-cyanobutadiene, cyclopentadiene, vinyl cyclohexene, isoprene, chloroprene cyclooctadiene, dipentene, indene or other diolefins, cyclic diolefins or mixtures thereof. The silicon halide acts as a catalyst and also reacts with the diene, so various amounts may be used (0.25 to 20 mols); 0.25 to 6 mols are preferred.

Any suitable allyl-type halide may be used in this invention, such as allyl chloride, allyl bromide and methallyl chloride, and mixtures thereof.

Any suitable phenol may be used in this invention such as phenol, cresols, xylenols, creosote, resorcinol, 2,2-bis(4-hydroxy phenyl) propane, thiophenol, thiocresol, and mixtures thereof.

Any suitable amino compound may be used in this invention such as urea, thiourea, dicyandiamine, aniline, polyamines, guanidine, alkyl-substituted ureas and thioureas, melamine, organic mono-amines and mixtures thereof.

Any suitable poly (organic alcohol) polymer such as poly (vinyl alcohol) polymer, poly (allyl alcohol) polymer, and mixtures thereof may be used in this invention.

Any suitable ketone may be used in this invention such as propanone, methyl ethyl ketone, methyl isopropyl ketone, methyl isobutyl ketone, methyl isoamyl ketone, methyl-n-propyl ketone, methyl-n-butyl ketone, methyl-t-butyl ketone, methyl furanyl ketone, methyl tetrahydrofuranyl ketone, methyl heptyl ketone, ethyl hexyl ketone, acetophenone, $\omega$-chloroacetophenone, propiophenone, and mixtures thereof.

Any suitable organic sulphonic acid, selected from the group consisting of methanesulfonic acid, ethanesulfonic acid, butanesulfonic acid, benzenesulphonic acid, 2-toluenesulphonic acid, 4-toluenesulphonic acid, chlorosulphonic acid esters e.g. methanesulphonic acid methyl esters, methane sulphonic acid ethyl ester and chlorosulphonic acid methyl ester, and mixtures thereof, may be used in this invention.

Any suitable organic nitrile may be used in this invention such as acetonitrile, propionitrile, butyronitrile, tolunitrile, hexahydrobenzonitrile, allylnitrile, methallylnitrile and mixtures thereof.

Any natural product which contains hydroxyl and/or carboxyl radicals and selected from the group consisting of wood, cellulose, dry sea weed, alginic acid, agar, hemicellulose, humic acid and mixtures thereof may be used in this invention.

Any suitable polyamide with free amino or carboxyl groups may be used in this invention.

Any suitable vegetable oil may be used in this invention such as soya bean oil, linseed oil, tung oil, dehydrated castor oil, castor oil, cottonseed oil, tall oil, fish oil, perilla oil, oiticica oil, sunflower oil, safflower oil, corn oil, walnut oil and mixture thereof.

Any suitable lignin may be used in this invention such as sulfite lignin, sulfate lignin, partially desulfonated sulfite lignin, calcium lignosulfonate, lignosulfonic acid sodium salts solvent extracted lignin and mixtures thereof.

The carboxyl acids and/or sulphonic acids may be partially or completely neutralized, for example, with alkali metal and alkaline earth metal hydroxides e.g., sodium hydroxide, potassium hydroxide, barium hydroxide, or magnesium hydroxide, or by the addition of amines, e.g. trimethylamine, triethylamine, methylmorpoline, pyridine, dimethylaniline, or metal alcoholates, e.g. sodium t-butanolate or potassium isopropanolate. Metal oxides, hydroxides or carbonates may also be used for neutralization. Calcium oxide, magnesium oxide, calcium carbonate, magnesium carbonate and dolomite, for example, are particularly suitable. Tertiary amines are useful in this neutralization, e.g. alkoxylated products of primary and secondary amines and also polyesters or polyacrylates which contain tertiary nitrogen atoms as well as the known condensation products based on epichlorohydrin and polyamines.

Any suitable organic halogen containing compounds such as alkyl and aryl halides may be used in this process. The organic halogen containing compounds include compounds such as ethyl chloride, ethyl bromide, ethyl iodide, n-propyl chloride, n-propylbromide, n-propyliodide, isopropyl chloride, isopropyl bromide, isopropyl iodide, butyl chloride, butyl bromide, butyl iodide $C_3$–$C_6$ halogenated methyl compounds, benzyl halides, e.g. benzyl chloride or benzylbromide, hexahydrobenzylhalides, e.g. cyclohexanomethyl chloride, methylene chloride, ethylene chloride and mixtures thereof.

Any suitable halohydrin may be used in this invention such as alpha-dichlorohydrin, dibromhydrin, di-iodohydrin, epibromhydrin, epi-iodohydrin, di-epi-iodohydrin, ethylene chlorohydrin and mixtures thereof.

Any suitable organic halide, consisting of alkyl halides, aryl halides and mixtures thereof may be reacted with the organic halosilicon acid resinous product in ethyl ether containing equal mols of metallic magnesium for each mol of the halide present in the mixture of organic halosilicon acid; the mixture is agitated at ambient temperature until the mixing is complete; then the mixture is heated to the boiling point of the mixture while agitating for about 1 hour; the mixture is then washed with water and filtered, thereby recovering granules of organic silicon acid resinous product.

The suitable organic compounds or mixtures thereof may be added with 0.25 to 2 mols of a phenol compound, 0.25 to 2 mols of a silicon acid and 1 mol of a silicon halide simultaneously in the amount of 0.25 to 2 mols, and selected from the group consisting of monohydroxy alcohols, polyols, monocarboxyl acids, polycarboxyl acids and anhydrides, aldehydes, halohydrins, epoxides, vinyl monomers, organic dienes, allyl type halides, phenols, amino compounds, ketones, organic sulfonic acids, organic nitriles, halogenated hydrocabons and mixtures thereof.

The phenol halosilicon acid resinous products may be hydrolyzed by adding water; this produces hydroxyl groups on the silicon atom and HCl. The hydroxyl groups on the silicon atom may be dehydrated and may be condensated into thermosetting resinous products. Mixed solvents may be used to hydrolyze the polyol halosilicon and resinous products, generally water with such compounds as dioxane, methylene dichloride, ethylene oxide, ferric chloride, triethyl orthoborate, antimony pentachloride, stannic chloride, and sulfuric acid.

Alkaline hydrolysis may be carried out by using acid binding compounds in water, such as sodium bicarbonate, sodium acetate, zinc oxide, calcium hydroxide and other inorganic acid binding compounds.

The organic silicon acid resinous products may be washed with water to remove any halogen, salt and unreacted organic compounds. The water is then filtered off.

The hydrolized phenol silicon acid resinous product and organic phenol silicon acid resinous product may be cured by the addition of aldehydes, such as formaldehydes, acetoaldehydes, furaldehyde etc., furfuryl alcohol, aminoplast such as butylated melamine formaldehyde resins, methylsilyl triacetate, lead monoxide and others.

The organic phenol silicon acid resinous product with free hydroxyl groups may be cured or further reacted with polycarboxyl acid and anhydrides, vegetable oils, fatty acids, polyisocyanates, polyesters with free carboxyl groups, polyamides with free carboxyl groups and epoxy compounds and resins with 2 or more epoxy groups.

The organic phenol silicon acid resinous product with free carboxy groups may be cured or further reacted with polyols, polyamines, polyisocyanates, dihydroxy phenols, aminoplasts with free hydroxy groups, polyamides with free amine groups, epichlorihydrin-polyamine condensation product with free amine groups and mixtures thereof.

The organic phenol silicon acid resinous product and phenol silicon acid resinous product which contain free hydroxyl and/or carboxyl groups may be modified with vegetable oils, saturated or unsaturated. The nondrying oils are used to make products that will form a hard film. The unsaturated (drying oils) are used to form hard films upon air drying. These products which have been modified with drying oils such as soya bean, linseed, tung and dehydrated castor oils are useful as coating preparations and are analogous to the alkyd resins. These products are soluble in organic solvents and may be used as paints and varnishes.

The organic phenols silicon acid resinous products may be cured and/or further reacted with aldehydes, epoxy compounds and resins with 2 or more epoxy groups, halohydrins, organic polyhalides, polycarboxyl acid, dicarboxyl acid anhydrides, carbon disulfide and mixtures thereof. They may be used as molding powder and molded into useful objects such as knobs, gears, toys, art objects, etc.

The organic silicon acid resinous products which contain unsaturated bonds may be cured and/or further reacted by adding a vinyl monomer such as vinyl acetate, acrylonitrile, methyl methacrylate, styrene, methyl styrene, n-vinyl-2-pyrrolidone, etc., and a peroxide initiator. These organic silicon acid resinous products are soluble in organic solvents and may be applied to fiberglass and cured in place to produce panels, boats, sheets, etc.

The vinyl phenol silicon acid resinous products are soluble in organic solvents and may be used as a coating agent. They may be molded into useful objects such as rods, sheets, tubes, etc., by heat and pressure. The diene polyol silicon acid resinous products may be molded into useful objects such as rods, sheets, tubes, etc., by heat and pressure. The phenol silicon acid resinous products are soluble in organic silvents and may be used as adhesives and coating agents and may be used as molding powder to produce rods, sheets, tubes, etc.

All of the resinous products produced by this invention will react chemically with polyisocyanate compounds and polyurethane prepolymer due to the presence of free silicic acid groups, although the resinous products with both silicic acid groups and hydroxyl and/or carboxyl groups are preferred. They will produce useful foams for insulation, sound proofing, floatation, etc. Resins which are soluble in organic solvents may be used for coating agents on metal and wood.

The organic halosilicon acid resinous products may be reacted with a mixture of organic dienes, vinyl and allyl halide to produce organic silicon acid which can be molded into useful tubes, sheets, rods, etc. They are soluble in organic solvents and may be used as coating agents and adhesives.

The primary object of the present invention is to produce organic silicon acid resinous products. It is a further object of the present invention to produce organic halosilicon acid resinous products which will react with organic compounds to produce useful organic silicon acid resinous products and foams. It is a further object of the present invention to prepare organic halosilicon acid resinous products that will react chemically with organometallic compounds containing a metal more active than silicon to produce organic silicon acid compounds and resinous products. Still a further object is to produce organic halosilicon acid resinous products which will react chemically with Grignard Reagents to produce organic silicon acid compounds and resinous products.

DESCRIPTION OF THE PREFERRED EMBODIMENTS

My invention will be illustrated in greater detail by the specific Examples that follow, it being understood that those preferred embodiments are illustrative of, but not limited to, procedures which may be used in the production of organic halosilicon acid resinous products. Parts and percentages are by weight unless otherwise indicated.

EXAMPLE 1

About equal mols of fine granular hydrated silica, phenol and silicon tetrachloride are slowly added simultaneously to a beaker while agitating for 1 to 8 hours and keeping the temperature below the boiling temperature of the mixture, thereby producing phenol halosilicon acid resinous product. Hydrogen chloride is given off from the mixture. Mols of hydrated silica are calculated on the mols of silicon dioxide present in the hydrated silica.

EXAMPLE 2

About 1 mol of fine granular hydrated silica, 0.5 mol of creosol and 1 mol of silicon tetrachloride are slowly added simultaneously while agitating and keeping the temperature below the boiling temperature of the mixture for 1 to 8 hours, thereby producing phenol halosilicon acid resinous product. Hydrogen chloride is given off. The product is a clear solid which pulverizes into a white powder. The white powder may be washed with water and filtered.

EXAMPLE 3

About 0.5 mol of hydrated silica containing Si-H bonds (silicoformic acid), about 1 mol of cresylic acid and 1 mol of silicon tetrachloride are slowly added simultaneously while agitating at ambient pressure and keeping the temperature below the boiling temperature of the mixture for 1 to 8 hours, thereby producing phenol halosilicon acid resinous product.

EXAMPLE 4

About 1 mol of fine granular hydrated silica, about 1 mol of thiophenol and 1 mol of silicon tetrachloride are slowly added simultaneously while agitating and keeping the temperature below the boiling temperature of the mixture for 1 to 8 hours, thereby producing thiophenol halosilicon acid resinous product.

EXAMPLE 5

About 1 part by weight of dry, fine granular hydrated silica, 0.5 part by weight of creosote and 1 part by weight of silicon tetrachloride are slowly added simultaneously while agitating and keeping the temperature below the boiling temperature of the mixture for 1 to 6 hours, thereby producing phenol halosilicon acid resinous product.

EXAMPLE 6

About 1 mol of dry granular silicic acid gel, mols calculated on the silicon dioxide content, 1 mol of resorcinol and 1 mol of silicon tetrachloride are slowly added simultaneously while agitating and keeping the temperature below the boiling temperature of the mixture for 1 to 2 hours; the reaction is complete in 2 to 8 hours, thereby producing resorcinol halosilicon acid resinous product.

EXAMPLE 7

About 1 mol of methyl magnesium chloride (Grignard Reagent), 0.5 mol of phenol, 1 mol of fine granular hydrated silica, and 1 mol of silicon tetrachloride are slowly added to ethyl ether while agitating and keeping the temperature below the boiling temperature of the mixture for 1 to 2 hours. The mixture is then heated while agitating until the ether evaporates. The reaction is complete in 2 to 8 hours, thereby producing methyl phenol silicon acid resinous product. The resinous product is washed with water, then filtered, to remove the magnesium chloride, thereby producing an organic silicon acid resinous product.

EXAMPLE 8

About 1 mol of fine granular hydrated silica, 0.25 mol of Bisphenol A, and 1 mol of silicon tetrachloride are slowly added simultaneously while agitating and keeping the temperature below the boiling temperature of the mixture for 1 to 2 hours; the reaction is complete in 2 to 8 hours; hydrogen chloride is evolved, thereby producing phenol chlorosilicon acid resinous product.

About 1 mol of methanol is added to the said phenol chlorosilicon acid resinous product while agitating (an excess of methanol may be used) for 1 to 2 hours at ambient temperature and pressure; the reaction is complete in 2 to 8 hours, thereby producing an organic silicon acid resinous product.

Other alcohols may be used in place of methanol such as ethanol, propanol, isopropyl alcohol, allyl alcohol, methallyl alcohol, furfuryl alcohol, butanol, isobutanol, t-butyl alcohol, isomeric pentanols, isomeric hexanols, isomeric heptanols, cyclohexanol, methylcyclohexanol, benzyl alcohol, cyclohexanomethanol and mixtures thereof.

EXAMPLE 9

About 0.5 mol of fine granular hydrated silica, 0.5 mol of phenol, 0.25 mol of resorcinol and 1 mol of silicon tetrachloride are slowly added simultaneously while agitating and keeping the temperature below the boiling temperature of the mixture for 1 to 2 hours; the reaction is complete in 2 to 8 hours, thereby producing a phenol halosilicon acid resinous product.

The said phenol halosilicon and resinous product are mixed with 1.5 mols of an aldehyde, acetaldehyde, at a temperature and pressure whereby the aldehyde is in a liquid state, then agitated for 1 to 2 hours; the reaction is complete in 2 to 8 hours, thereby producing an aldehyde phenol silicon acid resinous product.

Other aldehydes may be used in place of acetaldehyde such as formaldehyde, propionaldehyde, butyl aldehyde, furfural, pentanals, hexanals, heptanals, octanals and the corresponding semi-acetals and full acetals, crotonaldehyde, acrolein, acrylic aldehyde, chloral, paraformaldehyde and mixtures thereof.

EXAMPLE 10

About 1.5 mols of fine granular hydrated silica containing silicoformic acid, about 1 mol of 2,2-bis (4-hydroxy phenyl) propane and 1 mol of silicon tetrachloride are slowly added simultaneously while agitating and keeping the temperature below the boiling temperature of the mixture for 1 to 2 hours; the reaction is complete in 2 to 8 hours, thereby producing a phenol halosilicon and resinous product.

About 0.5 mol of a mono-carboxyl acid, acetic acid, is slowly added to said phenol halosilicon acid resinous product while agitating at ambient temperature for 1 to 2 hours; hydrochloric acid evolves; the reaction is complete in 2 to 8 hours, thereby producing an organic phenol silicon acid resinous product.

Other mono-carboxyl acids may be used in place of acetic acid such as formic acid, propanoic acid, glycolic acid, butanoic acid, pentanoic acid, hexanoic acid, heptanoic acid, octanoic acid, nanonoic, decanoic acid, undicylic acid, lauric acid, myristic acid, polymetic acid, stearic acid, malic acid and mixtures thereof.

EXAMPLE 11

About 1 mol of fine granular hydrated silica, 0.5 mol of cresol and 1 mol of silicon tetrachloride are slowly added, simultaneously, while agitating and keeping the temperature below the boiling temperature of the mixture for 1 to 2 hours; the reaction is complete in 2 to 8 hours, thereby producing a phenol halosilicon acid resinous product.

About 0.5 mol of a polycarboxylic acid, phthalic acid, is added to said phenol halosilicon resinous product while agitating and keeping the temperature just above the melting temperature of phthalic acid for 1 to 2 hours; the reaction is complete in 2 to 8 hours, thereby producing a polycarboxylic acid phenol silicon acid resinous product.

Other polycarboxylic acids may be used in place of phthalic acid such as maleic, succinic acid, oxalic acid, malonic acid, glutaric acid, adipic acid, pimelic acid, suberic acid, isophthalic acid, fumaric acid, azelaid acid, sebacic acid, terephthalic acid, itaconic acid, tartaric acid, fatty acids and mixtures thereof.

EXAMPLE 12

About 0.5 mol of fine granular hydrated silica, about 0.5 mol of phenol and 1 mol of silicon tetrachloride are slowly added simultaneously while agitating and keeping the temperature below the boiling temperature of the mixture for 1 to 2 hours; the reaction is complete in 2 to 8 hours, thereby producing phenol halosilicon acid resinous product.

About 1.5 mols of a carboxylic acid anhydride, maleic anhydride, are added to said phenol chlorosilicon acid resinous product while agitating at a temperature just above the melting temperature of the anhydride for 1 to 2 hours; the reaction is complete in 2 to 8 hours, thereby producing a polycarboxylic and phenol silicon acid resinous product.

Other carboxylic acid anhydrides may be used in place of maleic anhydride such as phthalic, succinic, glutaric, poly(adipic anhydride), tetrachlorophthalic, dl-camphoric, 1,2-cyclohexanedicarbolic, diglycolic, tetrahydrophthalic, dodecenylsuccinic, hexadecylsuccinic, nitrophthalic, ende-cis-5-norbornene-2, 3-dicarbolic, cis-4-cyclohexene-1, 2-dicarboxlic anhydrides, and pyromellitic dianhydride.

EXAMPLE 13

About 1 mol of hydrated silica, 1 mol of phenol and 1 mol of silicon tetrachloride are slowly added simultaneously while agitating and keeping the temperature below the boiling temperature of the mixture for 1 to 2 hours; hydrogen chloride evolves from the mixture; the reaction is complete in 2 to 8 hours, thereby producing phenol chlorosilicon resinous product.

About 1 mol of an epoxide, epichlorohydrin, is slowly mixed with the said resinous product while agitating and keeping the temperature below the boiling temperature of the mixture for 1 to 2 hours; the reaction is complete in 2 to 8 hours; hydrogen chloride is evolved from the mixture, thereby producing an epoxy phenol silicon acid resinous product. Other epoxides may be used in place of epichlorohydrin, such as ethylene oxide, propylene oxide, butylene oxide, tetrahydrofuran, styrene oxide, glycidol, methyl epichlorohydrin, 1,2-epoxybutane, 1,2-epoxycyclohexane, epoxyethane, 1,2-epoxypropane; 1-chloro-2,3-epoxypropane, 1:2,2:4-diepoxybutane, epoxyethylbenzene, 2:3,6,7-diepoxy-2, 6-dimethyl-4-octene, epoxidized polyhydroxy compounds, epoxidized vegetable oils, epoxidized unsaturated fatty acids, epoxidized diolefin or polyolefin compounds, glycidyl methacrylate, glycidyl acrylate and mixtures thereof.

EXAMPLE 14

About 0.5 mol of fine granular hydrated silica, 0.5 mol of resorcinol and 1 mol of silicon tetrachloride are slowly added while agitating and keeping the temperature below the boiling temperature of the mixture for 1 to 2 hours; the reaction is complete in 2 to 8 hours, thereby producing a phenol chlorosilicon acid resinous product. To this resinous product about 0.5 mol of phenol is added while agitating for 1 to 2 hours, thereby producing an organic silicon acid resinous product. Hydrogen chloride evolves from the mixture.

Other phenols may be used in place of phenol such as cresols, xylenols, creosote, resorcinol, 2,2-bis(4-hydroxy phenyl) propane, thiophenol, thiocresol and mixtures thereof.

EXAMPLE 15

About 0.5 mol of fine granular hydrated silica, 0.5 mol of phenol and 1 mol of silicon tetrachloride are slowly added simultaneously while agitating and keeping the temperature below the boiling temperature of the mixture for 1 to 2 hours; the reaction is complete in 2 to 8 hours, thereby producing a phenol chlorosilicon acid resinous product. To this resinous product 1.5 mols of an amino compound, ethylene diamine, are slowly added while agitating for 1 to 2 hours, thereby producing white granules of organic silicon acid resinous product.

Other amino compounds in place of ethylene diamine may be used, such as urea, thiourea, dicyandiamine, aniline, polyamines, quanidine, alkyl-substituted ureas and thioureas, melamine, organic mono-amines and mixtures thereof.

EXAMPLE 16

About 1 mol of fine granular hydrated silica, 0.5 mol of cresol and 1 mol of silicon tetrachloride are slowly added simultaneously while agitating and keeping the temperature below the boiling temperature for 1 to 2 hours; the reaction is complete in 2 to 8 hours, thereby producing a phenol chlorosilicon acid resinous product. To this resinous product about 1 mol of a ketone, acetone, is slowly added while agitating and keeping the temperature below the boiling temperature of the mixture for 1 to 2 hours; the reaction is complete in 2 to 8 hours, thereby producing granules of organic silicon acid resinous product.

Other ketones may be used in place of acetone such as methyl ethyl ketone, methyl isopropyl ketone, methyl isobutyl ketone, methyl isoamyl ketone, methyl-n-propyl ketone, methyl-n-butyl ketone, methyl-t-butyl ketone, methyl furanyl ketone, methyltetrahydrofuranyl ketone, methyl keptyl ketone, ethyl hexyl ketone, acetophenone, $\omega$-chloroacetophenone, propiophenone, and mixtures thereof.

EXAMPLE 17

One mol of fine granular hydrated silica, 1 mol of phenol and 1 mol of silicon tetrachloride are slowly added simultaneously while agitating for 1 to 2 hours; hydrogen chloride is evolved and the reaction is complete in 2 to 8 hours, thereby producing a phenol chlorosilicon acid reaction product. To this resinous product, 1 mol of 2-toluenesulphonic acid is slowly added while agitating for 1 to 2 hours; the reaction is complete in 2 to 8 hours, thereby producing toluene sulphonic acid phenol silicon acid resinous product, a white granular product.

Other sulfonic acids may be used in place of toluene sulphonic acid such as methanesulfonic acid, ethanesulfonic acid, butanesulfonic acid, benzenesulphonic acid, 4-toluenesulphonic acid, and chlorosulphonic acid esters and mixtures thereof.

EXAMPLE 18

About 0.5 mol of fine granular hydrated silica, 1 mol of a Bisphenol A and 1 mol of silicon tetrachloride are slowly added while agitating and keeping the temperature below the boiling temperature of the mixture for 1 to 2 hours, the reaction is complete in 2 to 8 hours, thereby producing white granular phenol chlorosilicon acid resinous product. To this resinous product, 1.5 mols of a halohydrin, ethylene chlorohydrin, are added while agitating at ambient temperature and pressure for 1 to 2 hours; the reaction is complete in 2 to 8 hours, thereby producing an organic silicon acid resinous product.

Other halohydrin compounds may be used in place of ethylene chlorohydrin such as alpha-dichlorohydrin, di-iodhydrin, dibromhydrin, epibromhydrin, epi-iodhydrin, di-epi-iodhydrin and mixtures thereof.

EXAMPLE 19

About 0.5 mol of fine granular sodium metasilicate pentahydrate, 0.5 mol of phenol and 1 mol of silicon tetrachloride are slowly added while agitating at ambient temperature and pressure for 1 to 2 hours; the reaction is complete in 2 to 8 hours, thereby producing white granules of phenol chlorosilicon acid resinous product and sodium chloride. To this resinous product, 1 mol of a nitrile, acetonitrile, is added while agitating and keeping the temperature below the boiling temperature of the mixture for 1 to 2 hours; the reaction is complete in 2 to 8 hours, thereby producing an organic silicon acid resinous product. The resinous product is washed with water and filtered to remove the salt.

Other nitriles may be used in place of acetonitrile such as propionitrile, butyronitrile, tolunitrile, hexahydrobenzonitrile, allylnitrile, methallylnitrile, and mixtures thereof.

The phenol chlorosilicon acid produced in this Example may be washed with water and filtered, thereby producing phenol silicon acid resinous product.

Other alkali metal silicates such as potassium and lithium silicate may be used in place of sodium silicate.

EXAMPLE 20

About 0.5 mol of hydrated silica, 0.5 mol of potassium metasilicate pentahydrate, 1 mol of fine hydrated silica, 1 mol of cresol and 1 mol of silicon tetrachloride are added simultaneously while agitating at a temperature from ambient to below the boiling temperature of the mixture for 1 to 2 hours; the reaction is complete in 2 to 8 hours, thereby producing a phenol halosilicon acid resinous product and potassium chloride. This resinous product is mixed with 1 mol of an allyl type halide, allyl chloride, while agitating at ambient pressure and at a temperature below the boiling temperature of the mixture for 1 to 2 hours; the reaction is complete in 2 to 8 hours, thereby producing an organic silicon acid resinous product. The resinous product is washed with water and filtered to remove the salt.

Other allyl type halides may be used in place of an allyl chloride such as allyl bromide, methallyl chloride and mixtures thereof.

EXAMPLE 21

About 0.25 mol of fine granular hydrated silica 0.5 mol of fine granular magnesium silicate, 0.5 mol of phenol, 0.5 mol of cresol, and 1 mol of silicon tetrachloride are slowly added simultaneously while agitating and keeping the temperature below the boiling temperature of the mixture for 1 to 2 hours; the reaction is complete in 2 to 8 hours, thereby producing a phenol chlorosilicon acid resinous product and magnesium chloride. About 1 mol of ethylene chloride is added to the resinous product while agitating and keeping the temperature below the boiling temperature of the mixture for 1 to 2 hours; the reaction is complete in 2 to 8 hours, thereby producing an organic silicon acid resinous product. The granular resinous product is then washed with water and filtered to remove the magnesium chloride.

Other organic halides may be used in place of ethylene chloride such as ethyl chloride, ethyl bromide, ethyl iodide, n-propyl chloride, n-propylbromide, n-propyliodide, isopropyl chloride, isopropyl bromide, isopropyl iodide, butyl chloride, butyl bromide, butyl iodide, $C_3$–$C_6$ halogenated methyl compounds, benzyl chloride, benzyl bromide, cyclohexanomethyl chloride, methylene chloride, ethylene chloride, trichloroethylene and mixtures thereof.

EXAMPLE 22

About 1 mol of hydrated silica, 0.5 mol of phenol and 1 mol of silicon tetrachloride are slowly added simultaneously while agitating and keeping the temperature below the boiling temperature of the mixture for 1 to 2 hours; the reaction is complete in 2 to 8 hours, thereby producing a phenol halosilicon acid resinous product. About 3 parts by weight of the resinous product are added with 1 part by weight of lignin sulfonic acid sodium salts while agitating for 1 to 2 hours, thereby producing an organic silicon acid resinous product.

Other types of lignin may be added in place of lignin sulphonic acid sodium salts such as sulfite lignin, sulfate lignin, partially desulfonated sulfite lignin, calcium lignosulfonate, solvent extracted lignin and mixtures thereof.

EXAMPLE 23

About 0.5 mol of hydrated silica, 0.5 mol of calcium silicate, 0.5 mol of cresol, wood flour equal to amount by weight of cresol, and 1 mol by weight of silicon tetrachloride are added simultaneously while agitating and keeping the temperature below the boiling temperature of the mixture for 1 to 2 hours; the reaction is complete in 2 to 8 hours thereby producing a phenol chlorosilicon acid resinous product. About 0.5 mol of other natural products which contain hydroxyl and/or carboxyl radicals may be used in place of wood such as cellulose, dry sea weed, alginic acid, agar, hemicellulose, humic acid and mixtures thereof. Other alkaline earth metal silicates may be used in place of calcium silicate such as magnesium silicate.

EXAMPLE 24

About 1 mol of hydrated silica, 0.5 mol of phenol and 1 mol of silicon tetrachloride are slowly added while agitating at ambient pressure and keeping the temperature below the boiling temperature of the mixture for 1 to 2 hours; the reaction is complete in 2 to 8 hours, thereby producing a phenol chlorosilicon acid resinous product. To about 3 parts by weight of the resinous product is added 0.5 to 2 parts by weight of a vegetable oil, linseed oil, while agitating at ambient temperature for 1 to 2 hours; the reaction is complete in 2 to 8 hours, thereby producing an organic silicon acid resinous product.

Other vegetable oils may be used in place of linseed oil such as soya bean, dehydrated castor, castor, cottonseed, tall, fish, perilla, oiticica, sunflower, safflower, corn, walnut and mixtures thereof.

EXAMPLE 25

About 1 mol of hydrated silica, 0.5 mol of thiocresol and 1 mol of silicon tetrachloride are slowly added simultaneously while agitating at ambient temperature for 1 to 2 hours; the reaction is complete in 2 to 8 hours, thereby producing a phenol chlorosilicon resinous product. To this resinous product, 0.25 to 6 mols of a vinyl monomer, styrene, are added while agitating at ambient temperature for 1 to 2 hours; the reaction is complete in 2 to 8 hours, thereby producing an organic silicon acid resinous product.

Other vinyl monomers may be used in place of styrene such as acrylic acid, methacrylic acid, ethyl acrylic acid, methyl methacrylic acid, methyl styrene, n-vinyl-2-pyrrolidone, vinyl acetate, methyl alkenes, vinyl alkyl ethers, allyl vinyl ethers, alicylic ethers, aryl alkyl vinyl ethers, aryl vinyl ethers, vinylidene chloride, vinyl chloride, vinyl toluenes, divinyl benzenes, acrylonitrile, methacrylonitrile, alkyl esters of acrylic and methacrylic acids in which the alkyl group contains 1–6 carbon atoms and mixtures thereof.

EXAMPLE 26

About 1 mol of hydrated silicon acid, 0.25 mol of phenol and 1 mol of silicon tetrachloride are slowly added simultaneously while agitating at ambient temperature for 1 to 2 hours; the reaction is complete in 2 to 8 hours, thereby producing a phenol chlorosilicon acid resinous product. To this resinous product, about 0.25 to 6 mols of an organic diene, isoprene, are added while agitating at a temperature between the liquid state and the boiling temperature of the diene for 1 to 2 hours; the reaction is complete in 2 to 8 hours, thereby producing a vinyl phenol silicon acid resinous product.

Other diolefin and cyclodiolefin may be used. Other organic dienes such as 1,3-butadiene, isobutylene, butylene, chloroprene, cyclopentadiene, cyclooctadiene, dipentene, indene, 4-vinyl-1-cyclohexene and mixtures thereof may be used in place of isoprene.

EXAMPLE 27

About 1 mol of fine granular hydrated silica, 0.25 mol of resorcinol and 1 mol of silicon tetrachloride are slowly added simultaneously while agitating and keeping the temperature below the boiling temperature of the mixture for 1 to 2 hours; the reaction is complete in 2 to 8 hours, thereby producing a phenol chlorosilicon resinous product. To this resinous product, 2 mols of butadiene, 1 mol of styrene and 1 mol allyl chloride are added while agitating at a temperature wherein the reactants are in a liquid state to just below the boiling temperature of the mixture for 1 to 2 hours; the reaction is complete in 2 to 8 hours, thereby producing an allyl halide-diene-vinylphenol silicon acid resinous product.

EXAMPLE 28

The phenol chlorosilicon resinous product as produced in Example 27 and in the same amount therein, is added to 2 mols of styrene, 1 mol of butadiene and 1 mol of acrylonitrile while agitating at a temperature wherein butadiene is in a liquid state, but near its boiling temperature for 1 to 2 hours; the reaction is complete in 2 to 8 hours, thereby producing an organic silicon acid resinous product.

EXAMPLE 29

The phenol chlorosilicon resinous product as produced in Example 26 and in the same amount therein is added to a mixture of 1 mol of methyl styrene 0.5 mol of vinylidene chloride, 1 mol of styrene 0.5 mol of vinyl chloride while agitating and keeping the temperature below the boiling temperature of the mixture for 1 to 2 hours; the reaction is complete in 2 to 8 hours, thereby producing an organic silicon acid resinous product.

Various mixtures of the organic dienes, vinyl monomers and allyl type halides may be reacted with the phenol halosilicon acid resinous products to produce organic silicon acid resinous products.

EXAMPLE 30

About 0.5 to 1 part by weight of hydrated silica, 0.5 to 2 parts by weight of cresol and 1 part by weight of silicon tetrachloride are mixed at ambient pressure and temperature for 1 to 2 hours; the reaction is complete in 2 to 8 hours, thereby producing a phenol chlorosilicon acid resinous product. The resinous product may be washed with water and filtered to remove any hydrogen chloride.

EXAMPLE 31

The cresol chlorosilicon acid resinous product as produced in Example 2 and in the same amount therein is mixed with 1 mol of dimethyl zinc in an ethyl ether solution while agitating for 1 to 2 hours at a temperature below the boiling temperature of the mixture. The mixture is then heated to above the boiling temperature of the ether for about 1 hour or until it evaporates. The reaction is complete in 2 to 8 hours, thereby producing organic silicon acid resinous product and zinc chloride. The mixture is washed with water and filtered to remove the zinc chloride.

Other organometallic compounds may be used in place of dimethyl zinc such as lithium organic compounds, sodium organic compounds, alkyl magnesium halides, aryl magnesium halides, and mixtures thereof in the amount of 0.25 to 1 mol to each mol of halogen present in the phenol halosilicon acid resinous product.

EXAMPLE 32

The phenol chlorosilicon acid resinous product as produced in Example 1 and in the same amount therein, 1 mol of ethyl chloride and metallic magnesium in the amount of 1 mol per 2 mols of chloride present in the mixture are added to ethyl ether while agitating for 1 to 2 hours; then the mixture is heated for about 1 hour until the ether evaporates. The reaction is complete in 1 to 2 hours, thereby producing an organic silicon acid resinous product and magnesium chloride. The mixture is washed with water, filtered, and the resinous product is recovered.

Other aryl and alkyl halides may be used in place of ethyl chloride.

It is, of course, to be understood that the foregoing Examples are intended to be illustrative only and that numerous changes can be made in the ingredients, proportions and conditions disclosed therein without departing from the spirit of the invention as defined in the appended claims.

I claim:

1. The process for the production of phenol halosilicon acid resinous products and their reaction products by the following steps:

(a) adding slowly and simultaneously 0.25 to 2 mols of a silicon acid, 0.25 to 2 mols of a phenol compound and 1 mol of a silicon halide having the structural formula:

$R_ySiX_z$ wherein X is halogen selected from the group consisting of chlorine and fluorine; R is independently selected from the group consisting a monovalent hydrogen radical and monovalent hydrocarbon radical; y is an integer 0 to 2; and z is an integer 1 to 4, inclusive; and the sum of y plus z is equal to 4, while (b) agitating at a temperature below the boiling temperature of the mixture for 1 to 2 hours; the reaction is complete in 2 to 8 hours, thereby (c) producing a phenol halosilicon acid resinous product.

2. The process of claim 1 wherein the silicon acid is selected from the group consisting of hydrated silica, hydrated silica containing SiH groups, naturally occurring silicates with free silicic acid groups and mixtures thereof.

3. The process of claim 1 wherein the phenol compound is selected from the group consisting of phenol, cresols, xylenols, creosote, resorcinol, 2,2-bis(4-hydroxy phenyl) propane, thiophenol, thiocresol, Bisphenol A and mixtures thereof.

4. The process of claim 1 wherein the silicon halide is silicon tetrachloride.

5. The process according to claim 1 wherein an additional step is added following step (c) wherein a polyhydric alcohol is added in the amount of 0.25 to 2 mols to each mol of halide present in the phenol silicon acid resinous product, then agitated for 1 to 2 hours; the reaction is complete in 2 to 8 hours, thereby producing organic polyhydroxy phenol silicon acid resinous products.

6. The process according to claim 1 wherein an additional step is added following step (c) wherein an alcohol selected from the group consisting of methanol, ethanol, propanol, isopropyl alcohol, allyl alcohol, furfuryl alcohol, butanol, isobutanol, t-butyl alcohol, isomeric pentanols, isomeric hexamols, isomeric heptanols, cyclohexanol, methylcyclohexanol, benzyl alcohol, cyclohexano-methanol, methallyl alcohol and mixtures thereof is slowly added in the amount of 0.25 to 1 mol to each mol of halide present in the phenol halosilicon acid resinous product, following step (c) of claim 1, then agitated for 1 to 2 hours; the reaction is complete in 2 to 8 hours, thereby producing an organic silicon acid resinous product.

7. The process of claim 1, wherein an additional step is taken following step (c) of claim 1 wherein an aldehyde, selected from the group consisting of formaldehyde, acetaldehyde, propionaldehyde, butyl aldehyde, furfural, pentanals, hexanals, heptanals, octanals, and the corresponding semi-acetals and full acetals, crotonaldehyde, acrolein, acrylic aldehyde, chloral, paraformaldehyde and mixtures thereof is slowly added in the amount of 0.25 to 1 mol to each mol of halide present in the phenol halosilicon resinous product, following step (c) of claim 1, then agitated for 1 to 2 hours; the reaction is complete in 2 to 8 hours, thereby producing an aldehyde phenol silicon acid resinous product.

8. The process of claim 1, wherein an additional step is taken following step (c) of claim 1, wherein a monocarboxylic acid, selected from the group consisting of formic acid, acetic acid, propanoic acid, glycolic acid, butanoic acid, pentanoic acid, hexanoic acid, heptanoic acid, octanoic acid, nanonoic acid, decanoic acid, undecyclic acid, lauric acid, myristic acid, palmetic acid, stearic acid, malic acid and mixtures thereof is slowly added in the amount of 0.25 to 1 mol to each mol of halogen present in the phenol halosilicon acid resinous product, then agitated for 1 to 2 hours at ambient temperature; the reaction is complete in 2 to 8 hours, thereby producing an organic acid phenol silicon acid resinous product.

9. The process of claim 1, wherein an additional step is taken following step (c) of claim 1 wherein a polycarboxylic acid in the amount of 0.25 to 1 mol to each mol of halogen present in the phenol halohydrin silicon acid resinous product and selected from the group consisting of phthalic acid, maleic acid, succinic acid, oxalic acid, malonic acid, glutaric acid, adipic acid, pimelic acid, suberic acid, isophthalic acid, fumeric acid, azelaic acid, sebacic acid, terephthalic acid, itaconic acid, tartaric acid and mixtures thereof is slowly added while agitating at a temperature between ambient and just above the melting temperature of the polycarboxylic acid, for 1 to 2 hours, the reaction is complete in 2 to 8 hours, thereby producing a polycarboxylic and phenol silicon acid resinous product.

10. The process of claim 1 where an additional step is taken following step (c) of claim 1 wherein a dicarboxylic acid anhydride, selected from the group consisting of phthalic anhydride, maleic anhydride, succinic anhydride, glutaric anhydride, poly(adipic anhydride), tetrachlorophthalic anhydride, 1,2-cyclohexanedicarbolic anhydride, diglycolic anhydride, dl-camphoric anhydride, tetrahydrophthalic anhydride, dodecenylsuccinic anhydride, hexadecylsuccinic anhydride, nitrophthalic anhydride, ende-cis-5-norbornene-2,3-dicarbolic anhydride, cis-4-cyclo-hexene-1,2-dicarbolic anhydride, pyromellitic dianhydride and mixtures thereof, and in the amount of 0.25 to 1 mol to each mol of halogen present in the phenol halosilicon acid resinous product, is slowly added while agitating at a temperature between ambient and just above the melting temperature of the dicarboxylic acid anhydride for 1 to 2 hours; the reaction is complete in 2 to 8 hours, thereby producing a polycarboxylic acid phenol silicon acid resinous product.

11. The process of claim 1 wherein an additional step is taken following step (c) of claim 1 wherein an epoxide compound, selected from the group consisting of ethylene oxide, propylene oxide, styrene oxide, butylene oxide, trichlorobutylene oxide, tetrahydrofuran, epichlorohydrin, glycidol, methyl epichlorohydrin, 1,2-epoxybutane, 1,2-epoxycyclohexane, epoxyethane, 1,2-epoxypropane, 1-chloro-2-3-epoxy propane, 1:2, 2:4-diepoxybutane, epoxyethylbenzene, 2:3, 6:7-diepoxy-2,6-dimethyl-4-octene, epoxidized polyhydroxy compounds, epoxidized vegetable oils, epoxidized unsaturated fatty acids, epoxidized diolefin or polyolefin compounds, unsaturated epoxide compounds such as glycidyl methacrylate and glycidyl acrylate and mixture thereof, in the amount of 0.25 to 1 mol to each mol of halogen present in the phenol halosilicon acid resinous product, is slowly added while agitating and keeping the temperature below the boiling temperature of the mixture for 1 to 2 hours; the reaction is complete in 2 to 8 hours, thereby producing an epoxy phenol silicon acid resinous product.

12. The process of claim 1 wherein an additional step is taken following step (c) of claim 1 wherein a vinyl monomer in the amount of 0.25 to 6 mols to each mol of halogen present in the phenol halosilicon acid product, and selected from the group consisting of acrylic acid, methacrylic acid, ethyl acrylic acid, methyl methacrylic acid, methyl styrene, styrene, n-vinyl-2-pyrrolidone, vinyl acetate, methyl alkenes, vinyl alkyl ethers, allyl vinyl ethers, alicyclic ethers, aryl alkyl vinyl ethers, aryl vinyl ethers, vinylidene chloride, vinyl toluenes, divinyl benzenes, vinyl chloride, acrylonitrile, methacrylonitrile, alkyl esters of acrylic and methacrylic acids in which the alkyl group contains 1–6 carbon atoms and mixtures thereof, is slowly added while agitating at a temperature between ambient and the boiling temperature of the mixture for 1 to 2 hours; the reaction is complete in 2 to 8 hours, thereby producing a vinyl phenol silicon acid resinous compound.

13. The process of claim 1 wherein an additional step is taken following step (c) of claim 1 wherein an organic diene, in the amount of 0.25 to 6 mols to each mol of halogen present in the phenol halosilicon acid resinous product, and selected from the group consisting of 1,3-butadiene, isobutylene, butylene, isoprene, chloroprene cyclopentadiene and mixtures thereof are slowly added at ambient pressure and at a temperature and pressure wherein the diene is in a liquid state, while agitating for 1 to 2 hours and the reacion is complete in 2 to 8 hours, thereby producing an organic diene phenol silicon acid resinous product.

14. The process of claim 1 wherein an additional step is taken following step (c) of claim 1 wherein a phenol compound, in the amount of 0.25 to 1 mol to each mol of halogen present in the phenol halosilicon acid resinous product and selected from the group consisting of phenol cresols, xylenols, creosote, resorcinol, 2,2-bis (4-hydroxy phenyl) propane, thiophenol, thiocresol and mixtures thereof is slowly added while agitating at ambient temperature and pressure for 1 to 2 hours; the reaction is complete in 2 to 8 hours, thereby producing a phenol silicon acid resinous product.

15. The process of claim 1 wherein an additional step is taken following step (c) of claim 1 wherein an amino compound in the amount of 0.25 to 1 mol to each mol of halogen present in the phenol halosilicon acid resinous product, and selected from the group consisting of urea, thiourea, ammonia dicyandiamine, aniline, polyamines, guanidine, alkyl-substituted ureas and thioureas, melamine and mixtures thereof is slowly added at ambient temperature and pressure while agitating for 1 to 2 hours; the reaction is complete in 2 to 8 hours, thereby producing an amino phenol silicon acid resinous product.

16. The process of claim 1 wherein an additional step is taken following step (c) of claim 1 wherein 1 mol of an organic halide for each mol of halide present in the phenol halosilicon acid resinous product, consisting of alkyl halide, aryl halides and mixtures thereof, and 1 mol of metallic magneisum for each mol of the halide present in the alkyl halide or aryl halide and ethyl ether are added to the phenol halosilicon acid resinous product while agitating at ambient temperature until the reaction is complete; then the mixture is heated to the boiling temperature of the mixture while agitating for about 1 hour; the mixture is then washed with water and filtered, thereby recovering granules of organic silicon acid compounds.

17. The process of claim 1 wherein an additional step is taken following step (c) of claim 1 wherein an allyl halide in the amount of 0.25 to 6 mols to each mol of halide present in the phenol halosilicon acid resinous product and selected from the group consisting of allyl chloride, allyl bromide, methallyl chloride and mixtures thereof is added while agitating at ambient temperature and pressure for 1 to 2 hours; the reaction is complete in 1 to 8 hours, thereby producing allyl chloride phenol silicon acid resinous product.

18. The method of claim 1 wherein an additional step is taken following step (c) of claim 1 wherein an organometallic compound, selected from the group consisting of lithium organic compounds, sodium organic compounds, dimethyl zinc, alkyl magnesium halides, aryl magnesium halides, and mixtures thereof, is added in the amount of 0.25 to 1 mol to each mol of halogen present in the phenol halosilicon acid resinous product and agitated in ether at ambient temperature and pressure until the reaction is complete, then heated to the boiling point of the mixture while agitating for about 1 hour; the mixture is then washed with water and filtered, thereby recovering organic silicon acid resinous product.

19. The process of claim 1 wherein an additional step is taken following step (c) of claim 1 wherein the phenol halosilicon and resinous product is washed with water and filtered, thereby producing phenol silicon acid resinous product.

20. The process of claim 1 wherein an additional step is taken following step (c) of claim 1 wherein an organic halohydrin, selected from the group consisting of ethylene chlorohydrin, alpha-dichlorohydrin, dibromohydrin, di-iodohydrin, epibromohydrin, epi-iodohydrin, di-epi-iodohydrin, and mixtures thereof is added in the amount of 0.25 to 1 mol to each mol of halogen present in the phenol halosilicon acid resinous product, while agitating at ambient temperature and pressure for 1 to 2 hours; the reaction is complete in 2 to 8 hours, thereby producing an organic halohydrin phenol silicon acid resinous product.

21. The process of claim 1 wherein an organic compound, selected from the group consisting of monohydroxy alcohols, polyols, monocarboxyl acids, polycarboxyl acids, dicarboxylic acid anhydrides, aldehydes, halohydrins, epoxides, vinyl monomers, organic dienes, allyl type halides, phenols, vegetable oils, amino compounds, ketones, organic sulfonic acids, organic nitriles, halogenated hydrocarbons and mixtures thereof, is added in step (c) of claim 1 in the amount of 0.25 to 3 mols, thereby producing an organic phenol silicon acid resinous product in step (c) of claim 1.

22. The process of claim 1 wherein an additional step is taken wherein an organic nitrile compound, selected from the group consisting of acetonitrile, propionitrile, butyronitrile, tolunitrile, hexahydrobenzonitrile, allylnitrile, methallylnitrile and mixtures thereof is added after step (c) of claim 1 in the amount of 0.25 to 1 mol to each mol of halide present in the phenol halosilicon acid resinous product while agitating at ambient pressure and temperature for 1 to 2 hours; the reaction is complete in 2 to 8 hours, thereby producing an organic phenol silicon acid resinous product.

23. The process of claim 1 wherein an additional step is taken wherein a natural product, selected from the group consisting of wood, cellulose, sea weed, alginic acid, agar, hemicellulose, humic acid and mixture thereof, is added in the amount of 1 to 2 parts by weight to 2 parts by weight of the phenol compound and is added in step (a) of claim 1, thereby producing an organic silicon acid resinous product in step (c) of claim 1.

24. The process of claim 1 wherein an additional step is taken wherein lignin, selected from the group consisting of sulfite lignin, sulfate lignin, partially desulfonated sulfite lignin, calcium lignosulfonate, lignosulfonic acid sodium salts, solvent extracted lignin and mixtures thereof, is added in the amount of 1 to 2 parts to 2 parts of the phenol compound in step (a) of claim 1, thereby producing lignin phenol silicon acid resinous product.

25. The process of claim 1 wherein an additional step following step (c) of claim 1 is taken wherein an organic sulfonic acid, selected from the group consisting of methanesulfonic acid, ethanesulfonic acid, butanesulfonic acid, benzenesulphonic acid, 2-toluenesulphonic acid, 4-toluenesulphonic acid, chlorosulphonic acid esters and sulfonic acid esters and mixtures thereof, is added in the amount of 0.25 to 1 mol of organic sulfonic acid to 1 mol of the halogen present in the phenol halosilicon acid resinous product while agitating at ambient temperature and pressure for 1 to 2 hours; the reaction is complete in 2 to 8 hours, thereby producing an organic sulfonate phenol silicon acid resinous product.

26. The process of claim 1, wherein an additional step is taken following step (c) of claim 1 wherein a ketone, selected from the group consisting of methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methylfuranyl ketone, methyl-tetrahydrofuranyl ketone, methylheptyl ketone, ethyl-hexyl ketone, acetaphenone, ω-chloroacetophenone, propiophenone propanone and mixtures thereof, is added in the amount of 0.25 to 1 mol to each mol of halogen present in the phenol halosilicon acid resinous product while agitating at ambient temperature and pressure for 1 to 2 hours; the reaction is completed in 2 to 8 hours, thereby producing ketone phenol silicon acid resinous product.

27. The process of claim 1 wherein an additional step is taken following step (c) of claim 1 wherein a vegetable oil, selected from the group consisting of soya bean, linseed, tung, dehydrated castor, castor, cottonseed, tall, fish, perilla, oiticica, sunflower, safflower, corn and walnut oils and mixtures thereof, is added in the amount of 0.25 to 1 mol of hydroxyl and/or carboxyl group present in the vegetable oil to 1 mol of the halogen present in the phenol halosilicon acid resinous product while agitating at ambient temperature for 1 to 2 hours; the reaction is complete in 2 to 8 hours, thereby producing an organic silicon acid resinous product.

28. The process of claim 1 wherein an additional step is taken following step (c) of claim 1 wherein a halogen containing compound, selected from the group consisting of ethyl chloride, ethyl bromide, ethyl iodide, n-propyl chloride, n-propylbromide, n-propyliodide, isopropyl chloride, isopropyl bromide, isopropyl iodide, butyl chloride, butyl bromide, butyl iodide, $C_3$-$C_6$ halogenated methyl compounds, benzyl chloride, benzyl bromide, cyclohexanomethyl chloride, methylene chloride, ethylene chloride, trichloroethylene and mixtures thereof, is added in the amount of 0.25 to 1 mol to each mol of halogen present in the phenol halosilicon acid resinous product while agitating at ambient temperature and pressure for 1 to 2 hours; the reaction is completed in 2 to 8 hours, thereby producing halogenated organic phenol silicon acid resinous product.

29. The process of claim 1 wherein an additional step is taken before step (a) of claim 1 wherein the silicon acid compound is reacted with an alkali metal hydroxide compound to produce an alkali metal silicate compound and is added in step (a) of claim 1 in place of the silicon acid compound, and wherein the alkali metal hydroxide is selected from the group consisting of sodium hydroxide, potassium hydroxide, lithium hydroxide and mixtures thereof.

30. The process of claim 1 wherein an additional step is taken before step (a) of claim 1 wherein the silicon acid compound is reacted with an alkaline earth metal hydroxide to produce an alkaline earth compound and is added in step (a) of claim 1 in place of the silicon acid compound, and wherein the alkaline earth metal hydroxide is selected from the group consisting of calcium hydroxide, magnesium hydroxide, and mixtures thereof.

31. The product as produced by the process of claim 1.

32. The product as produced by the process of claim 22.

33. The product, organic silicon acid resinous product as produced by the method of claim 19.

34. The product of claim 5.

35. The product of claim 6.

* * * * *